US008964761B2

(12) United States Patent
Shin et al.

(10) Patent No.: US 8,964,761 B2
(45) Date of Patent: Feb. 24, 2015

(54) DOMAIN NAME SYSTEM, MEDIUM, AND METHOD UPDATING SERVER ADDRESS INFORMATION

(75) Inventors: Soon Churl Shin, Ansan-si (KR); Woo Jin Yang, Seoul (KR); Sang Moon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1917 days.

(21) Appl. No.: 11/546,898

(22) Filed: Oct. 13, 2006

(65) Prior Publication Data

US 2007/0165542 A1 Jul. 19, 2007

(30) Foreign Application Priority Data

Jan. 19, 2006 (KR) ........................ 10-2006-0005708

(51) Int. Cl.
*H04L 12/28* (2006.01)
*H04L 29/12* (2006.01)
(52) U.S. Cl.
CPC ...... *H04L 61/1511* (2013.01); *H04L 29/12066* (2013.01); *H04L 29/12132* (2013.01); *H04L 29/12301* (2013.01); *H04L 61/1552* (2013.01); *H04L 61/2076* (2013.01); *H04L 61/20* (2013.01)
USPC ...... 370/395.54; 370/354; 370/352; 370/360; 370/386; 370/389; 370/390; 370/395.3; 370/400; 370/428; 370/475; 709/201; 709/207; 709/217; 709/223; 709/224; 709/225; 709/226; 709/229; 709/230; 709/231; 709/245

(58) Field of Classification Search
None
See application file for complete search history.

(56) References Cited

U.S. PATENT DOCUMENTS 6,016,512 A * 1/2000 Huitema ........................ 709/245
7,574,508 B1 * 8/2009 Kommula ..................... 709/226
(Continued)

FOREIGN PATENT DOCUMENTS

JP 2001-103092 4/2001
JP 2003-218941 7/2003
(Continued)

OTHER PUBLICATIONS

Strong Cache Consistency Support for Domain Name System, white paper, http://web.archive.org/web/20050515030532/http://www.cs.wm.edu/~hnw/paper/dnscup_abstract.pdf, retrieved using web archive with publication date of May 15, 2005, Chen et. al.*

(Continued)

*Primary Examiner* — Faruk Hamza
*Assistant Examiner* — Aixa A Guadalupe-Cruz
(74) *Attorney, Agent, or Firm* — NSIP Law

(57) ABSTRACT

A method of a first DNS which can update server information in real time without necessarily using a TTL (Time To Live) by recording a network address of the first DNS, which has previously obtained server address information from a second DNS, in a notification list, by the second DNS, and transmitting the changed information from the second DNS to the first DNS recorded in the notification list when the previously obtained/requested server address changes, and updating the server address by the first DNS as provided by the second DNS. A DNS updating server address method may further include providing a first DNS with server address information corresponding to a domain, recording a network address of the first DNS in a notification list, corresponding to the domain and/or the server address information, and transmitting a changed server address information to the first DNS based on the notification list.

11 Claims, 7 Drawing Sheets

(56) References Cited

U.S. PATENT DOCUMENTS

2005/0169249 A1 8/2005 Shirota et al.
2006/0112176 A1* 5/2006 Liu et al. .................... 709/223

FOREIGN PATENT DOCUMENTS

| JP | 2003-229881 | 8/2003 |
|----|----|----|
| KR | 10-2003-0034365 | 5/2003 |
| KR | 10-2003-0044526 | 6/2003 |
| KR | 10-2004-0066333 | 7/2004 |
| KR | 10-2004-0103980 | 12/2004 |
| KR | 10-2005-0086925 | 8/2005 |

OTHER PUBLICATIONS

Xin Chen et al., "Strong Cache Consistency Support for Domain Name System", College of William and Mary, SIGCOMM 2004.

* cited by examiner

FIG.4

| DOMAIN 401 | NETWORK ADDRESS 402 |
|---|---|
| novel.book.com | company.com |
| | company2.com |
| | ⋮ |
| new.book.com | DNS.com |
| | hanbit.com |
| | ⋮ |

FIG. 5

| NETWORK ENVIRONMENT AND NETWORK SETUP | | | | EFFICIENCY COMPARISON | | | | |
|---|---|---|---|---|---|---|---|---|
| FIRST DNS | | SECOND DNS | | CONVENTIONAL TECHNIQUE | | PRESENT EMBODIMENT | | |
| DIGITS | REBOOTING NUMBER (YEAR) | TTL(h) | NUMBER OF UPDATING SERVER ADDRESS (YEAR) | TRAFFIC (t/min) | ERROR TIME (h) | TRAFFIC (t/min) | ERROR TIME (h) | STORAGE SPACE (MB) |
| 1000 | 1 | 720 | 21 | 2 | 7560 | 0 | 0 | 10 |
| 5000 | 4 | 480 | 20 | 48 | 4800 | 0 | 0 | 50 |
| 10000 | 7 | 360 | 19 | 191 | 3420 | 0 | 0 | 100 |
| 15000 | 10 | 288 | 18 | 429 | 2592 | 1 | 0 | 150 |
| 20000 | 13 | 240 | 17 | 762 | 2040 | 1 | 0 | 200 |
| 25000 | 16 | 216 | 16 | 1191 | 1728 | 2 | 0 | 250 |
| 30000 | 19 | 192 | 15 | 1715 | 1440 | 2 | 0 | 300 |
| 35000 | 22 | 168 | 14 | 2334 | 1176 | 2 | 0 | 350 |
| 40000 | 25 | 144 | 13 | 3049 | 936 | 3 | 0 | 400 |
| 45000 | 28 | 120 | 12 | 3859 | 720 | 3 | 0 | 450 |
| 50000 | 31 | 96 | 11 | 4765 | 528 | 4 | 0 | 500 |
| 55000 | 34 | 72 | 10 | 5768 | 360 | 5 | 0 | 550 |
| 60000 | 37 | 48 | 9 | 6870 | 216 | 5 | 0 | 600 |
| 65000 | 40 | 24 | 8 | 8084 | 96 | 6 | 0 | 650 |
| 70000 | 43 | 20 | 7 | 9381 | 70 | 7 | 0 | 700 |
| 75000 | 46 | 16 | 6 | 10780 | 48 | 7 | 0 | 750 |
| 80000 | 49 | 12 | 5 | 12288 | 30 | 8 | 0 | 800 |
| 85000 | 52 | 8 | 4 | 13923 | 16 | 9 | 0 | 850 |
| 90000 | 55 | 4 | 3 | 15786 | 6 | 10 | 0 | 900 |
| 95000 | 58 | 2 | 2 | 17963 | 2 | 11 | 0 | 950 |
| 100000 | 61 | 1 | 1 | 20693 | 1 | 12 | 0 | 1000 |

DOMAIN NAME SYSTEM, MEDIUM, AND METHOD UPDATING SERVER ADDRESS INFORMATION

CROSS-REFERENCE TO RELATED APPLICATIONS

This application claims the benefit of Korean Patent Application No. 10-2006-0005708, filed on Jan. 19, 2006, in the Korean Intellectual Property Office, the disclosure of which is incorporated herein by reference.

BACKGROUND OF THE INVENTION

1. Field of the Invention

An embodiment of the present invention relates to a DNS (Domain Name System) system, medium, and method updating server address information, and more particularly to a system, medium, and method recording a network address of a DNS that has previously obtained server address information in a notification list, such that when the server address information changes the changed server address information is transmitted to the DNS to update the server address information recorded in the notification list. Thus, server address information stored by a DNS can be updated in real time, without necessarily requiring the use a TTL (Time To Live).

2. Description of the Related Art

Recently, due to the development of the Internet, IP (Internet Protocol) addresses have been allocated and used in nearly every terminal and every server, in order to connect with various web services, such web servers, e-mail servers, and the like, providing a user terminal with various services. However, since an IP address may be made up of many digits, it is typically not easy for a user to recognize and use all the digits of an IP address. Accordingly, users utilize domain names in their user terminals, with the domain names corresponding to a particular IP address. A DNS has been used for translating the domain names into corresponding IP addresses. Normally, a DNS includes a distributed database having a hierarchical name configuration with each client server model utilizing the distributed database for hierarchical communication.

FIG. 1 illustrates a conventional DNS system operation.

First, when a user wants to connect to a first server 105, e.g., corresponding to a domain "novel.book.com" through a user terminal, the user terminal requests, from a first DNS 101, the actual IP address corresponding to the domain "novel.book.com" via a DNS client program.

Upon the request, the first DNS 101 further requests from "root DNS" 102 for an IP address of "corn DNS" 103, managing a domain of a ".com", in order to determine the IP address corresponding to the domain of a "novel.book.com," in operation S101. Thereafter, "root DNS" 102 transmits the IP address "1.2.3.5" of the "com DNS" to the first DNS 101 after referring to a database 106 of the "root DNS" 102 for the IP address of the "corn DNS". In this instance, the IP address "1.2.3.4" of the "root DNS" 102, used to contact the "root DNS" 102, may be recorded in a predetermined storage unit 109 included in the first DNS 101, for example.

Second, in operation S102, the first DNS 101 requests from the "corn DNS" 103 for an IP address of a "book DNS" 104 managing a domain of "book.com". The "corn DNS" 103 transmits the IP address "1.2.3.6" of the "book DNS" to the first DNS 101 after referring to a database 107 of the "corn DNS" 103 for the IP address of the "book DNS".

Finally, the first DNS 101 queries the "book DNS" 104 for the IP address of "novel.book.com," in an operation S103, which transmits the IP address of "1.2.3.7" corresponding to the "novel.book.com" after referring to a database 108.

The first DNS 101 then transmits the IP address "1.2.3.7", corresponding to the IP address of "novel.book.com", to the user terminal. The user terminal may then connect to a host server 105 corresponding to the IP address "1.2.3.7", in operation S104.

However, whenever a user terminal requests an IP address corresponding to a domain, the first DNS 101 stores the IP address corresponding to the domain in the storage unit 109, and also stores a TTL value, as defined in the DNS 104, in the storage unit 109, this repeatedly executing of the operations S101 to S103 may become a load on the first DNS 101.

After the period of time of the TTL passes, the first DNS server 101 will update the IP address corresponding to the domain when the IP address corresponding to the "novel.book.com" is requested, by repeating the execution of the operations S101 to S103.

However, when the IP address corresponding to the domain changes before the passage of the TTL period, the IP address maintained in the first DNS 101 will contain an invalid IP address, as it hasn't been updated. Therefore the IP address provided to a user terminal, from the first DNS 101, will also be invalid, resulting in a connection failure to the domain.

Consequently, to solve the above described problems, the inventors have found a need for the development of an operation of a DNS which may update a stored IP address corresponding to a domain in real time, thereby avoiding the above problems when the IP address changes and preventing connection failures.

SUMMARY OF THE INVENTION

An aspect of an embodiment of the present invention provides a system, medium, and method in which a first DNS provides a user terminal with changed server address information by referring to a storage unit when a request for server address information corresponding to a domain is received from a user terminal.

An aspect of an embodiment of the present invention further provides a system, medium, and method in which a second DNS updates server address information stored in a first DNS when the server address information changes, with the changed information being provided to every DNS that has obtained server address information.

An aspect of an embodiment of the present invention further provides a system, medium, and method in which a second DNS updates changed server address information in real time when the server address changes, even when a period of time determined by a corresponding TTL has not passed, so that correct server address information may be provided.

An aspect of an embodiment of the present invention further provides a system, medium, and method in which a second DNS provides a user terminal with an updated server address corresponding to a domain by updating the server address before a connection attempt to the server corresponding to the domain fails, so that such a connection failure by a user terminal may be prevented and such that the conventional time consumed by connection failures, caused by invalid server address information, may be remarkably reduced.

Additional aspects and/or advantages of the invention will be set forth in part in the description which follows and, in part, will be apparent from the description, or may be learned by-practice of the invention.

To achieve the above and/or other aspects and advantages, embodiments of the present invention include a method for updating server address information by a second Domain Name System (DNS), the method including providing a first Domain Name System (DNS) with server address information corresponding to a domain, and transmitting a changed server address information to the first DNS upon the server address information corresponding to the domain changing, wherein the changed server address information is for a same domain as the domain provided to the first DNS but represents a change in the server address information for the domain.

The method may further include recording a network address of the first DNS in a notification list, corresponding to the domain or the server address information, wherein the transmitting of the changed server address information is accomplished by referring to the notification list, upon the server address information of the domain changing, for the network address of the first DNS.

Here, the notification list may include network addresses for a plurality of DNS's and identifies corresponding domains and/or server address information previously requested by each of the plurality of DNS's for transmitting corresponding changed server address information to each DNS, of the plurality of DNS's, that had previously requested a corresponding server address information.

In addition, he first DNS may maintain a first storage unit for recording server address information corresponding to a plurality of domains, receives the changed server address information, and delete previously stored corresponding server address information that is recorded in the storage unit and replace the deleted previously stored corresponding server address information with the changed server address information.

Further, the transmitting of the changed server address information may include transmitting the changed server address information to a plurality of DNS's upon the server address information corresponding to the domain changing, wherein the changed server address information is for a same domain as the domain provided to the first DNS, and previously provided to the plurality of DNS's, but represents a change in the server address information for the domain.

To achieve the above and/or other aspects and advantages, embodiments of the present invention include a method for updating server address information in a first DNS, the method including receiving server address information corresponding to a domain from a second DNS, and receiving a changed server address information from the second DNS, transmitted by the second DNS upon detection by the second DNS of the server address information corresponding to the domain changing, wherein the changed server address information is for a same domain as the domain received by the first DNS but represents a change in the server address information for the domain.

The method may further include recording the received server address information corresponding to the domain in a storage unit.

Here, the method may still further include deleting the received server address information recorded in the storage unit upon receipt of the changed server address information.

In addition, the method may include, upon a request for the server address information for the domain from a user terminal, providing the user terminal with the received server address information corresponding to the domain if no changed server address information is received from the second DNS, and providing the user terminal with the changed server address information corresponding to the domain if the changed server address information is received from the second DNS.

Further, the second DNS may be utilizing a method of providing the first DNS with the received server address information, recording a network address of the first DNS in a notification list, and transmitting the changed server address information to the network address of the first DNS by referring to the notification list upon the detection by the second DNS of the server address information corresponding to the domain changing.

To achieve the above and/or other aspects and advantages, embodiments of the present invention include at least one medium including computer readable code to implement embodiments of the present invention.

To achieve the above and/or other aspects and advantages, embodiments of the present invention include a system to update server address information of a first DNS by a second DNS, the system including a providing unit to provide the first DNS with server address information corresponding to a domain, and a transmission module to transmit a changed server address information to the first DNS upon the server address information corresponding to the domain changing, wherein the changed server address information is for a same domain as the domain provided to the first DNS but represents a change in the server address information for the domain.

The system may further include a notification list recording unit to record a network address of the first DNS in a notification list, corresponding to the domain or the server address information, wherein the transmitting by the transmission module of the changed server address information is accomplished by referring to the notification list upon the server address information of the domain changing for the network address of the first DNS.

Here, the notification list may include network addresses for a plurality of DNS's and identify corresponding domains and/or server address information previously requested by each of the plurality of DNS's for transmitting corresponding changed server address information to each DNS, of the plurality of DNS's, that had previously requested a corresponding server address information.

In addition, the first DNS may maintain a first storage unit to record server address information corresponding to a plurality of domains, and delete previously stored corresponding server address information that is recorded in the storage unit and replace the deleted previously stored corresponding server address information with the changed server address information.

Further, the transmission module may transmit the changed server address information to a plurality of DNS's upon the server address information corresponding to the domain changing, wherein the changed server address information is for a same domain as the domain provided to the first DNS, and previously provided to the plurality of DNS's, but represents a change in the server address information for the domain.

To achieve the above and/or other aspects and advantages, embodiments of the present invention include a system to update server address information of a first DNS by a second DNS, the system including a receiving unit to receive server address information corresponding to a domain from the second DNS, and a server address updating module to receive a changed server address information from the second DNS, transmitted by the second DNS upon detection by the second DNS of the server address information corresponding to the domain changing, wherein the changed server address information is for a same domain as the domain received by the first DNS but represents a change in the server address information for the domain.

The system may further include a storage unit to store the received server address information corresponding to the domain.

Here, the server address updating unit may delete the received server address information stored in the storage unit upon receipt of the changed server address information.

In addition, the system may include a server address providing unit, wherein, upon a request for the server address information for the domain from a user terminal, the server address providing unit provides the user terminal with the received server address information corresponding to the domain if no changed server address information is received from the second DNS by the receiving unit, and provides the user terminal with the changed server address information corresponding to the domain if the changed server address information is received from the second DNS by the receiving unit.

Further, the system may include a storage unit to record the received server address information and/or the changed server address information, wherein the second DNS further stores a network address of the first DNS in a notification list, and transmits the changed server address information to the network address of the first DNS, to be stored in the storage unit, by referring to the notification list upon the detection by the second DNS of the server address information corresponding to the domain changing.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 4 illustrates a notification list, according to an embodiment of the present invention;

FIG. 5 illustrates experimental results comparing efficiencies between an embodiment of the present invention and a conventional technique;

DETAILED DESCRIPTION OF THE PREFERRED EMBODIMENTS

Figure 1:
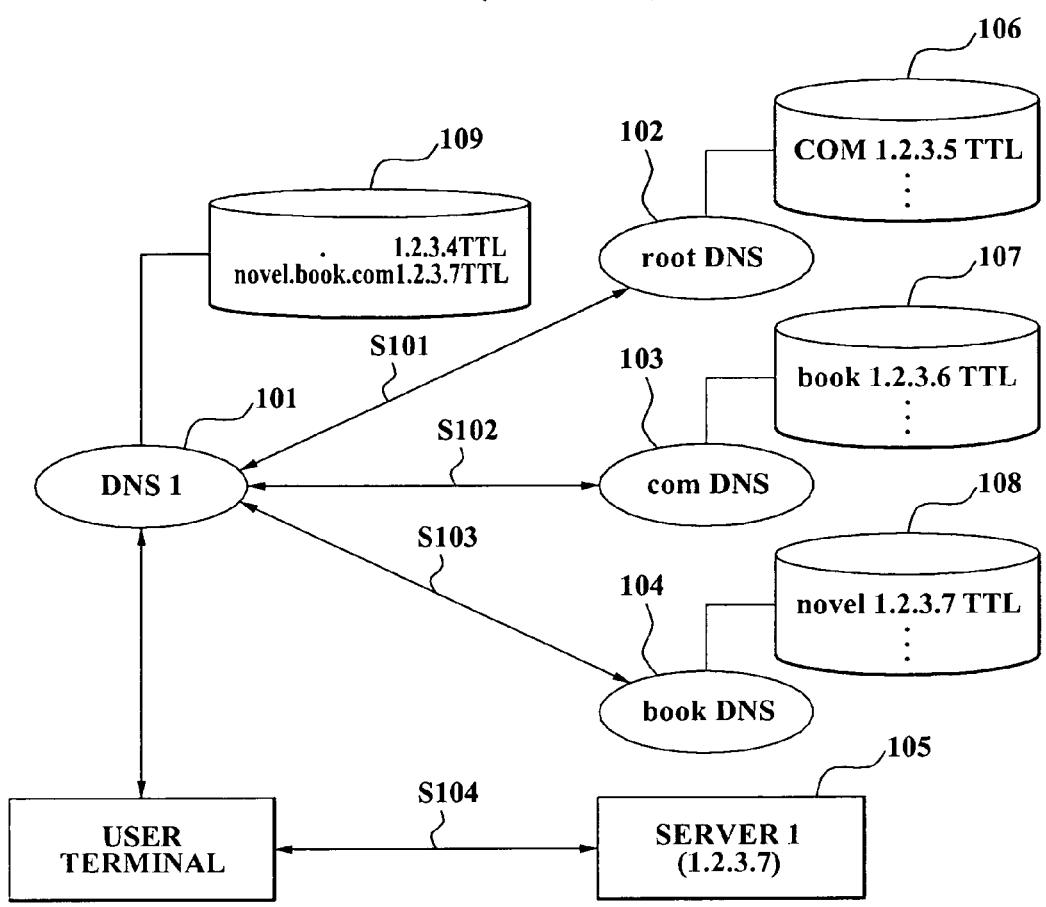
FIG. 1 illustrates a conventional DNS system operation.

Reference will now be made in detail to embodiments of the present invention, examples of which are illustrated in the accompanying drawings, wherein like reference numerals refer to the like elements throughout. Embodiments are described below in order to explain the present invention by referring to the figures.

Figure 2:
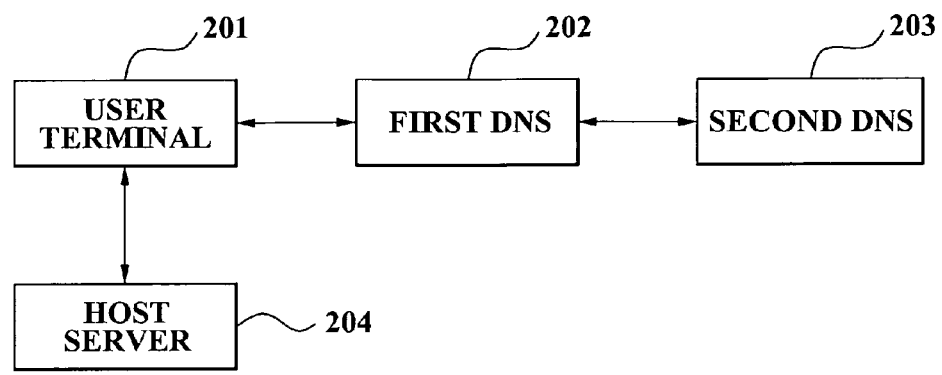
FIG. 2 illustrates a network connection of a DNS, according to an embodiment of the present invention.

FIG. 2 illustrates a network connection of a DNS, according to an embodiment of the present invention. Referring to FIG. 2, a first DNS 202, may provide a user terminal 201 with server address information of a host server 204 that may be connectable from the user terminal 201.

The server address information, according to embodiments of the present invention, may be a type of IP address information including all address information required for a connection to the server. According to an embodiment, the server address may also have a corresponding domain.

The user terminal 201 may be any type of terminal, such as a PC (Personal Computer), a PDA (Personal Digital Assistant), a smart phone, a handheld PC, a mobile phone, an MP3 player and the like, and may be provided with a communication module such as a CDMA (Code Division Multiple Access) module, a Bluetooth module, an Infrared Data Association communication (IrDA) module, and provided with a predetermined processing function by being equipped with a microprocessor, for example. Alternative embodiments are equally available.

As illustrated in FIG. 2, the user terminal 201 connects to the host server 204 by using server address information received from a first DNS 202. Here, the first DNS 202 and a second DNS 203 may be connected through a network, and changed server address information may be updated between them.

Figure 3:
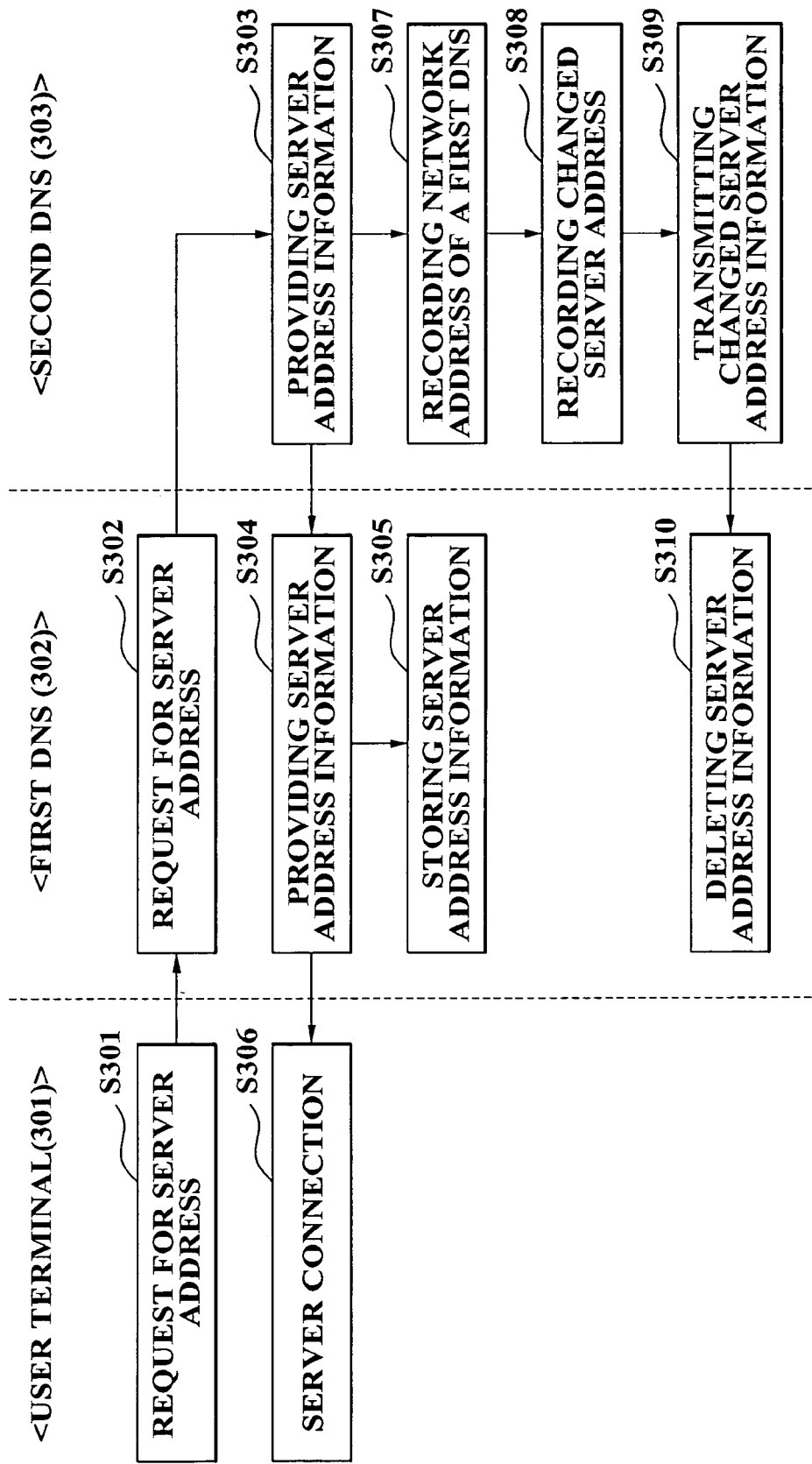
FIG. 3 illustrates an operation of a DNS updating server address information, according to an embodiment of the present invention.

FIG. 3 illustrates an operation of a DNS updating server address information, according to an embodiment of the present invention.

Referring to FIG. 3, in operation S301, a user terminal 301 may make a request to a first DNS 302 for server address information corresponding to a domain, for example. As such an example, the user terminal 301 may request, from the first DNS 302, for server address information corresponding to above example "novel.book.com". In this instance, the first DNS 302, may request from a second DNS 303, which may be managing server address information related to a domain of a "book.com", for the server address information. As an example, the first DNS 302 could be a DNS managing a domain of "company.com", for example.

In operation S302, the first DNS 302 may request from a root DNS for the server address information of a "com DNS", managing a domain of a ".com", and then may request from the "com DNS" for the server address information of a "book DNS" managing the domain of a "book.com," and may then finally request from the second DNS 303 for "book DNS" for the server address information of "novel.book.com".

Here, the second DNS 303, in operation S303, may transmit the corresponding server address information to the first DNS 302 by determining server address information corresponding to the requested domain. As an example, the second DNS 303 may transmit server address information of "1.2.3.7" corresponding to "novel.book.com" to the first DNS 302, e.g., after referring to a database that may record server address information corresponding to the domain.

In this instance, the second DNS 303 may record the network address of a DNS, from a retrieved server address information, in a notification list, as corresponding to the domain. Here, the network address may include any type of address information that may be allocated to the DNS in a network, for example, IP address information of the DNS.

FIG. 4 illustrates a notification list, according to an embodiment of the present invention. Referring to FIG. 4, a second DNS may record a network address 402 of a DNS and server address information corresponding to a domain 401.

As an example, the second DNS may record "company.com", "company2.com" and the like, as a network address of the DNS that has obtained server address information corresponding to "novel.book.com".

Referring to FIG. 3 again, the first DNS 302, in operation S304 may provide a user terminal 301 with server address information corresponding to the requested domain. As an example, the first DNS may store server address information of "1.2.3.7" corresponding to "novel.book.com" in a storage unit. In this instance, the storage unit may be characterized as any type of a device that may store server address information in any type of configuration, such as a common database, a cache, a temporary data storage unit and the like, corresponding to a plurality of domains.

The user terminal 301 may further connect to a host server corresponding to the domain by using the provided server address information, in operation S306. Hereinafter, in the user terminal 301, server address information corresponding to the domain, may be requested from the first DNS 302 and the first DNS 302 may provide the user terminal 301 the server address information corresponding to the domain by translating the server address information recorded in the storage unit.

When the server address corresponding to the domain changes, the changed server address information is recorded in the second DNS 303, in operation S308, and the changed server address information may be transmitted to the first DNS network address by referring to the notification list, in operation S309.

As an example, when the server address information corresponding to "novel.book.com" changes from "1.2.3.7" to "1.2.3.8", the second DNS 303 may record the changed server address information in a database and then transmit the same to the network address of the first DNS "company.com" by referring to the notification list.

In operation S310, the first DNS 302 may receive the changed server address information and may further delete the old server address information corresponding to the domain, e.g., recorded in the storage unit, when a request for the server address information corresponding to the domain is received from the user terminal 301, and may further update the user terminal 301 with the received server address information. In this instance, the server address of "1.2.3.7", corresponding to "novel.book.com" may be deleted, and when the request for server address information is received from the user terminal, the server address information can be updated to "1.2.3.8" for the user terminal 301.

Thus, according to an embodiment of the present invention, security can be maintained in that when a request for server address information is repeatedly received, such updating of the server address information prevents the storage unit from being overloaded, and accordingly help such a first DNS to operate safely.

Accordingly, according to an embodiment, when the first DNS 302 receives a request for server address information corresponding to a domain, e.g., from the user terminal 301, the first DNS 302 can provide the user terminal with the changed server address information by referring to its storage unit.

Accordingly, according to an embodiment, with such an aforementioned second DNS 303, when server address information corresponding to a domain changes, the changed information may be provided to every DNS that has obtained server address information so that the server address information stored in each corresponding first DNS can be updated in real time.

That is, in the aforementioned conventional techniques, even though server address information corresponding to a domain changes in a second DNS, previous server address information, e.g., recorded in a storage unit, is not updated until a period of time of a TTL passes. On the other hand, according to an embodiment of present invention, since a TTL is not necessarily used for updating server address information, when server address information changes the correct server address information may be provided.

In addition, according to an embodiment of the present invention, a user terminal may be provided with an updated server address through an updating of the server address corresponding to a domain before a connection to a server fails, i.e., before a user attempts to access the server through an outdated address, thereby avoiding the waste of a time in connection errors caused by such invalid server address.

FIG. 5 illustrates a result of an experiment that compared efficiencies between an embodiment of the present invention and a device using a conventional technique. Referring to FIG. 5, the traffic and error times of the conventional technique 502 and the traffic and error times of the embodiment of the present invention 503 are compared for various network environments and network setups 501. As shown by FIG. 5, the traffic and error times of this embodiment of the present invention can be seen to be remarkably reduced 504 over the conventional technique.

As an example, as seen in the remarkably reduced traffic and error time 504 of FIG. 5, when the number of first DNS's is around 10,000, the number reboots in a year is 7 times, the TTL of a second DNS is 360 hours, the number updating of a server address is 19 times in the second DNS, and according to the conventional technique, the traffic for synchronizing a server address of a second DNS is 191 (t/min), and the time consumed by errors is 3420 hours. However, according to the embodiment of the present invention, the traffic is zero (t/min), and the error time is zero, resulting in no traffic and no time being consumed by errors occurring in the network. However, compared to the conventional technique, an additional storage space may be needed for storing an aforementioned notification list.

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), and optical recording media (e.g., CD-ROMs, or DVDs), for example. The media may also be a distributed network, so that the computer readable code is stored/transferred and executed in a distributed fashion.

Figure 6:
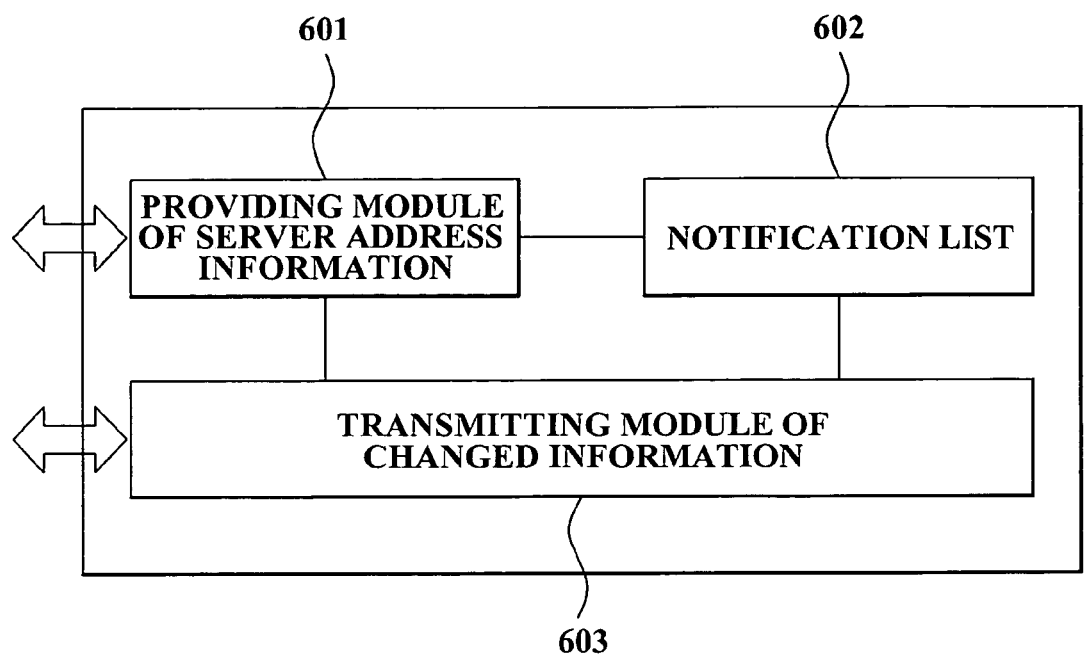
FIG. 6 illustrates a DNS, according to an embodiment of the present invention.

FIG. 6 illustrates a configuration of a DNS, according to an embodiment of the present invention. Referring to FIG. 6, the DNS may include a providing module 601 for providing a first DNS with server address information corresponding to a domain, a notification list 602 to store a network address of the first DNS corresponding to the domain or the server address information, and a transmitting module 603 for transmitting the changed information to the network address of the first DNS when the server address information changes.

In this instance, the first DNS may maintain a certain storage unit recording server address information corresponding to a plurality of domains, and update the changed server address information after deleting old server address information corresponding to the domain, e.g., which may be recorded in the storage unit, by receiving the changed server address information, e.g., when a request for the server address information is received from a user terminal.

Figure 7:
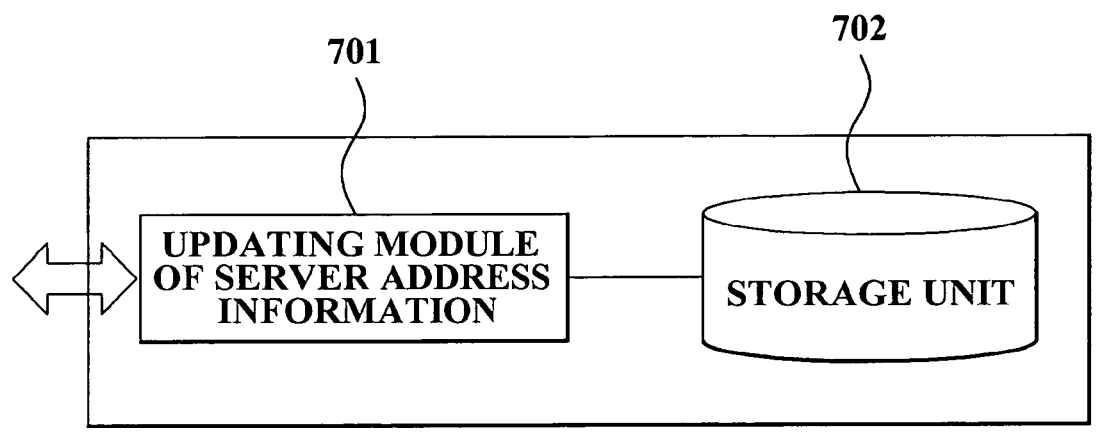
FIG. 7 illustrates a DNS, according to another embodiment of the present invention.

FIG. 7 illustrates a configuration of a DNS, according to another embodiment of the present invention. Referring to FIG. 7, the DNS may include an updating module 701 for updating server address information and a storage unit 702, for example.

The storage unit 702 may store server address information corresponding to a domain, received from a second DNS.

The updating module 701 of the server address information may delete server address information corresponding to the domain, e.g., recorded in the storage unit, upon receiving the changed server address information and may update the changed server address information to the user terminal after a request for the server address information is received from a user terminal, for example.

A configuration of FIG. 7 may indicate a first DNS and a configuration of FIG. 6 may indicate a second DNS, however DNS embodiments of the present invention may be able to execute both a client ability and a server ability in turns, such that the configurations of FIG. 6 and FIG. 7 may also be applicable to a first DNS and a second DNS, respectively.

A first DNS of an embodiment of the present invention may provide a user terminal with changed server address information by referring to a storage unit, for example, when a request for server address information corresponding to the domain is received from a user terminal.

In addition, according to an embodiment, when server address information changes, an IP address stored in the first DNS may be updated from the second DNS in real time since the changed information is provided to every DNS that has previously obtained the server address information from the second DNS.

Further, according to an embodiment of the present invention, since a TTL is not necessarily used for updating server address information when server address information changes, correct server address information may be provided with lower costs to the system.

Still further, according to an embodiment of the present invention, before a connection to a server corresponding to a domain fails, an updated server address corresponding to a domain may be provided to a user terminal through an updating of a server address, so that such a connection failure for the user terminal is avoided and time delays resulting from such a connection failure, caused by such an invalid server address information, may be remarkably reduced.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method for notifying server address-change information by a second Domain Name System (DNS), the method comprising:
    providing a first Domain Name System (DNS) among a plurality of DNS's with server address information corresponding to a domain requested by the first DNS;
    recording, in the second DNS, a network address of the first DNS in a notification list, corresponding to the domain or the server address information; and
    transmitting in real-time, by the second DNS, server address-change information to the first DNS and to every DNS among the plurality of DNS's that previously requested the server address information corresponding to the domain, wherein at least one DNS other than the first DNS previously requested server address information corresponding to the domain,
    wherein the transmitting of the server address-change information is accomplished by referring to the notification list, upon the server address information of the domain changing, and time-to-live (TTL) value information is not required to transmit the address-change information.

2. The method of claim 1, wherein the notification list includes network addresses for a plurality of DNS's and identifies corresponding domains and/or server address information previously requested by each of the plurality of DNS's for transmitting corresponding server address-change information to each DNS, of the plurality of DNS's, that had previously requested a corresponding server address information.

3. The method of claim 1, wherein the first DNS maintains a storage to record server address information corresponding to a plurality of domains, receives the server address-change information, and deletes previously stored corresponding server address information that is recorded in the storage.

4. A method for updating server address information in a first DNS, the method comprising:
    receiving server address information corresponding to a domain from a second DNS;
    receiving server address-change information from the second DNS, transmitted by the second DNS in real-time, upon detection by the second DNS of the server address information corresponding to the domain changing;
    deleting the server address information corresponding to the domain after receiving the server address-change information from the second DNS;
    requesting current server address information corresponding to the domain to the second DNS; and
    receiving current server address information corresponding to the domain from the second DNS,
    wherein time-to-live (TTL) value information is not required to receive the address-change information.

5. The method of claim 4, further comprising:
    recording the received current server address information corresponding to the domain in a storage unit.

6. At least one non-transitory medium comprising computer readable code to implement the method of claim 1.

7. At least one non-transitory medium comprising computer readable code to implement the method of claim 4.

8. A system to update server address information of a first DNS by a second DNS, among a plurality of DNS's, the system comprising:
    a providing unit, comprising a processor, to transmit to the first DNS server address information corresponding to a domain requested by the first DNS;
    a notification list recording unit to record, in the second DNS, a network address of the first DNS in a notification list, corresponding to the domain or the server address information; and
    a transmission module, comprising a processor, to transmit from the second DNS in real-time server address-change information to the first DNS and to every DNS among the plurality of DNS's that previously requested the server address information corresponding to the domain, upon the server address information corresponding to the domain changing,
    wherein at least one DNS other than the first DNS previously requested server address information corresponding to the domain,
    the transmitting by the transmission module of the server address-change information is accomplished by referring to the notification list upon the server address information of the domain changing for the network address of the first DNS, and time-to-live (TTL) value information is not required to transmit the address-change information.

9. The system of claim 8, wherein the notification list includes network addresses for a plurality of DNS's and identifies corresponding domains and/or server address information previously requested by each of the plurality of DNS's for transmitting corresponding server address-change information to each DNS, of the plurality of DNS's, that had previously requested a corresponding server address information.

10. The system of claim 8, wherein the first DNS maintains a storage to record server address information corresponding to a plurality of domains, and deletes previously stored corresponding server address information that is recorded in the storage upon receipt of the server address-change information.

11. A system to update server address information of a first DNS by a second DNS, the system comprising:

a receiving unit, comprising a processor, to receive server address information corresponding to a domain from the second DNS and to receive server address-change information from the second DNS, transmitted by the second DNS in real-time, upon detection by the second DNS of the server address information corresponding to the domain changing;

a storage to record, at the first DNS, the received server address information upon receipt of the server address-change information, wherein the second DNS further stores a network address of the first DNS in a notification list, and transmits in real-time the server address-change information to the network address of the first DNS, to be stored in the storage, by referring to the notification list upon the detection by the second DNS of the server address information corresponding to the domain changing; and a server address updating unit, comprising a processor, to delete the received server address information stored in the storage upon receipt of the server address-change information, wherein time-to-live (TTL) value information is not required to receive the address-change information.

* * * * *